(12) United States Patent
Frost et al.

(10) Patent No.: US 11,980,886 B2
(45) Date of Patent: May 14, 2024

(54) BOTTOM FORMING PROCESS

(71) Applicants: SCHOTT AG, Mainz (DE); SCHOTT Schweiz AG, St. Gallen (CH)

(72) Inventors: Robert Frost, Grub AR (CH); Doris Moseler, Budenheim (DE); Günter Weidmann, Flonheim (DE); Roman Huhn, St. Gallen (CH)

(73) Assignees: SCHOTT PHARMA SCHWEIZ AG, St. Gallen (CH); SCHOTT PHARMA AG & CO. KGAA, Mainz (DE)

( * ) Notice: Subject to any disclaimer, the term of this patent is extended or adjusted under 35 U.S.C. 154(b) by 748 days.

(21) Appl. No.: 17/126,600

(22) Filed: Dec. 18, 2020

(65) Prior Publication Data

US 2021/0188687 A1 Jun. 24, 2021

(30) Foreign Application Priority Data

Dec. 20, 2019 (EP) .................................... 19219010

(51) Int. Cl.
*C03B 23/11* (2006.01)
*A61J 1/14* (2023.01)
(Continued)

(52) U.S. Cl.
CPC ............. *B01L 3/508* (2013.01); *A61J 1/1468* (2015.05); *B65D 1/0261* (2013.01); *B65D 81/30* (2013.01);
(Continued)

(58) Field of Classification Search
CPC ........ C03B 23/11; C03B 23/112; C03B 33/06
See application file for complete search history.

(56) References Cited

U.S. PATENT DOCUMENTS 2,282,993 A 5/1942 Dichter
2,835,079 A * 5/1958 Camarata ................ C03B 23/11
65/174
(Continued)

FOREIGN PATENT DOCUMENTS

CN 105271655 1/2016
CN 105377779 3/2016
(Continued)

OTHER PUBLICATIONS

ISO 7884-6:1987, "Glass—Viscosity and viscometric fixed points—Part 6: Determination of softening point", First Edition, Dec. 15, 1987, 8 pages.
(Continued)

*Primary Examiner* — Cynthia Szewczyk
(74) *Attorney, Agent, or Firm* — Ruggiero McAllister & McMahon LLC

(57) ABSTRACT

A process for preparing a glass container that includes: providing a glass tube with a first portion, a second portion, and a longitudinal axis ($L_{tube}$); holding the first portion in a first clamping chuck and the second portion in a second clamping chuck; rotating the glass tube around the longitudinal axis ($L_{tube}$); heating, via a heater, the glass tube above a glass transition temperature; separating the first and second portions from one another by pulling apart along the longitudinal axis ($L_{tube}$) while the heated glass tube is still rotating by moving the first and the second chucks away from each other; and moving the heater, while moving the first and second chucks away from each other, so that the heater follows a mass that remains at a circular end region of the first and/or second portion.

21 Claims, 10 Drawing Sheets

(51) Int. Cl.
  *B01L 3/00* (2006.01)
  *B65D 1/02* (2006.01)
  *B65D 81/30* (2006.01)
  *C03B 23/08* (2006.01)
  *C03B 23/09* (2006.01)
  *C03B 33/06* (2006.01)
  *A61J 1/05* (2006.01)

(52) U.S. Cl.
  CPC .............. *C03B 23/08* (2013.01); *C03B 23/09* (2013.01); *C03B 23/112* (2013.01); *A61J 1/05* (2013.01); *B01L 2300/0832* (2013.01); *B01L 2300/0851* (2013.01)

(56) References Cited

U.S. PATENT DOCUMENTS

| | | |
|---|---|---|
| 3,874,867 A | 4/1975 | Dichter |
| 5,263,615 A | 11/1993 | Anderson |
| D419,452 S | 1/2000 | Devore |
| 6,363,750 B1 * | 4/2002 | Chiodo ............... C03B 23/0473 65/276 |
| D536,616 S | 2/2007 | Rubin |
| D561,026 S | 2/2008 | Rica |
| D635,856 S | 4/2011 | Lauret |
| D647,405 S | 10/2011 | Lauret |
| D785,455 S | 5/2017 | James |
| 10,472,118 B2 | 11/2019 | Pedmo |
| 10,968,005 B2 | 4/2021 | Arregui Letamendi |
| 11,014,701 B2 | 5/2021 | Langsdorf |
| 11,376,191 B2 | 7/2022 | Langsdorf |
| 11,634,248 B2 | 4/2023 | Rizzo |
| 2003/0134060 A1 | 7/2003 | Walther |
| 2006/0267250 A1 | 11/2006 | Gerretz |
| 2013/0334259 A1 | 12/2013 | White |
| 2014/0326695 A1 | 11/2014 | Paredes |
| 2015/0102004 A1 | 4/2015 | Kelly |
| 2015/0147497 A1 | 5/2015 | Brouwer |
| 2016/0016841 A1 | 1/2016 | Frost |
| 2016/0107918 A1 | 4/2016 | Delgado Carranza |
| 2016/0130170 A1 | 5/2016 | Maennl |
| 2016/0244354 A1 | 8/2016 | Segner |
| 2016/0256910 A1 | 9/2016 | Niec |
| 2018/0265243 A1 | 9/2018 | Gutekunst |
| 2019/0263707 A1 | 8/2019 | Frost |
| 2019/0350806 A1 | 11/2019 | Langsdorf |
| 2020/0072736 A1 | 3/2020 | Long |
| 2020/0307850 A1 | 10/2020 | Melrose |
| 2020/0399165 A1 | 12/2020 | Frost |
| 2021/0188687 A1 | 6/2021 | Frost |
| 2022/0168185 A1 | 6/2022 | Redkar |
| 2022/0409484 A1 | 12/2022 | Evans |

FOREIGN PATENT DOCUMENTS

| | | |
|---|---|---|
| CN | 105906193 | 8/2016 |
| CN | 207391262 | 5/2018 |
| EP | 1754688 | 2/2007 |

OTHER PUBLICATIONS

DIN EN ISO 8362-1, Injection containers and accessories—Part 1: Injection vials made of glass tubing:, Jun. 2016, 15 pages.
ISO 12775, 1st edition Oct. 15, 1997, 14 pages.
Section 3.2.1 of the European Pharmacopoeia, 7th edition, 2011, 5 pages.

* cited by examiner

102 part A part B

Prior art

100

BOTTOM FORMING PROCESS

CROSS REFERENCE TO RELATED APPLICATIONS

This application claims benefit under 35 USC § 119 of European Application 19219010.6 filed Dec. 20, 2019, the entire contents of which are incorporated herein by reference.

BACKGROUND

1. Field of the Invention

The present invention relates to a process for the preparation of a glass container from a glass tube in a glass processing machine, to glass containers, to a plurality of glass containers and to a glass processing machine.

2. Description of Related Art

Glass bottles that are used for pharmaceutical purposes (also known as so-called "vials") are usually prepared from borosilicate glass by hot-forming a borosilicate glass tube. In such a process in a first step the orifice of the vial is formed from the open tube end, wherein this orifice often has the form of a rolled-rim. Thereafter the vial bottom is formed and simultaneously the vial is separated from the residual of the glass tube. For the formation of the vial bottom the glass tube is, for example, secured in a vertical position by means of upper and lower clamping chucks and is then rotated around its longitudinal axis. The rotating glass tube in a certain region is heated by one or two separating gas burners until the heated mass of glass becomes deformable. As soon as this temperature is reached, the tube—under continuing rotation and heating by means of the burner—is extended in axial direction by means of a linear downwards movement of the lower chuck. Thereby the tube in the heated region extends under simultaneous tapering of its diameter, so that a constriction region in the form of a glass thread is formed. After the downward movement the constriction region is further heated. In this way the glass tube at the constriction region further contracts by means of the flow pressure of the burner gases so that the glass walls in the heated region melt together and finally the connection between the upper and the lower tube region pulls off. Thus, two tube regions (or sections) with closed ends are generated, wherein the lower tube region is the final vial, and the upper tube region is the residual glass tube from which further vials can be formed. In a subsequent step below the upper tube section a so-called "piercing burner" is placed to melt again the bottom of the upper tube section.

Such a prior art process for the manufacture of pharmaceutical vials is shown in FIG. 1. The vials are manufactured from a glass tube on various machine platforms. By far the most common variant, due to its simplicity and small footprint, is the one in which both the tubes (part A: large wreath 113A) and the separated vials (part B: small wreath 113B) are held vertically in rotating chucks on two adjacent rotating rings (113A, 113B). This type of machine has the working positions (1 to 16: part A and 1 to 8: part B) arranged one after the other as shown in FIG. 1, between which the tubes and vials are transported by the wreaths in clocked fashion.

During the above-described thermal separation of the lower and the upper tube region, a membrane-like bottom is created. In order to provide a bottom thickness that roughly corresponds to the tube wall thickness, the glass in the bottom region has to be kept liquefied at the first positions of the B-wreath under the most massive supply of heat. However, the centrifugal force prevents the glass from penetrating to the center of the bottom, i.e., to the center of rotation. A large part gets stuck at about ⅔ of the bottom radius and forms a typical "ring bead".

Furthermore, when the upper and lower tube regions are drawn apart from each other in the process described above and when in the course of that process a progressive, rotationally symmetrical constriction of the tube occurs until only one thread remains, this tread finally breaks off near its upper end where the gas separation burner are located. The thread essentially falls downwards onto the membrane-like floor in the middle, where it forms an accumulation of glass mass called "the knot". The minimum bottom thickness is usually found between the ring bead and the knot, the thickest part is usually the knot itself.

Depending on the diameter of the pipe, usually three extremely powerful, radially arranged burners are typically required for melting the glass mass into the bottom, one or two axially arranged burners are used to distribute the knot and an axially arranged cooling air nozzle is used to cool the bottom down to a higher viscosity before contact with the so-called bottom mold matrix. The contact with the die forms the outer contour of the vial bottom and at the same time cools it down to a viscosity that provides sufficient stability against self-reforming.

The above-described prior art process requires a high degree of care and qualification of the machine operators in order to adjust this process appropriately. In fact, it is a very special handcraft that requires special skills of the craftsman for whom the machine is only a tool. The prior art process, which is highly sensitive to numerous small external influences, is predominantly depended from the machine operator, not from the machine. Such a process thus necessarily struggles with a high manufacturing tolerance which leads to the production of different bottom geometries not only from hour to hour, but also from shift to shift and also from lot to lot. As both the packaging material and the filled and sealed vial, i.e., the finished medical product, are usually optically inspected in automated and adaptive optical inspection machines, the high manufacturing tolerance with respect to the bottom geometry in the prior art process also leads to a large number of results that cannot be interpreted by these inspection machines and whose associated products are ejected from the automated process. Furthermore, a strongly pronounced knot can disturb the images of a horizontally aligned camera to the point of uselessness if the camera is moved from top to bottom and the knot at the bottom of the vial then enters the image from below, which usually also has a strongly exemplar-specific size and pronunciation.

But not only the optical inspection, but also the chemical properties of the inner surfaces of glass containers that are formed by the above-described prior art process are often disadvantageous. Due to the high temperatures which are maintained over a longer period of time during the formation of the final shape of the bottom a large proportion of the more volatile glass components, in particular the alkali (predominantly sodium) and alkaline earth ions, which are not covalently but instead only ionically bound, as well as boron compounds of various kinds evaporate.

The evaporation inside the vial, which leads to sodium depletion at the bottom and the wall surfaces near the bottom, leads to a glass composition which is closer to quartz glass than the original composition was. Although this leads to the positive effect of a higher chemical resistance against hydrolytic attack by aqueous products contained in the glass vials, some of the evaporation products settle on the colder inner surfaces and are fixed at these locations during the relaxation process. Alkaline compounds close to the surface are thus formed which lead to a significantly reduced overall resistance to hydrolysis, in particular to a significantly higher alkali release to the aqueous product compared with the alkali release of the original glass tube. Furthermore, the depletion of sodium in the surface regions near the bottom has a particularly detrimental effect if the packing medium is to be chemically pre-stressed/tempered. During chemical hardening in a salt bath, the sodium ions of the glass layer near the surface are exchanged for potassium ions in a diffusion process, resulting in a permanent compressive stress state near the surface. Due to the depletion of near-surface sodium, however, this exchange process is greatly reduced in the near-surface area, which can lead to a very inhomogeneous stress distribution. This in turn can lead to chemically pre-stressed vials being less stable to external forces than non-pre-stressed vials, so that the hardening process can produce the opposite of what is intended.

SUMMARY

In general, it is an object of the present invention to at least partly overcome a disadvantage arising from the prior art. It is a particular object of the present invention to provide a process for the preparation of a glass container in a glass processing machine, particularly for the preparation of glass vials, which allows the preparation of glass vials with a reduced number of process steps compared to the process known from the prior art. It is a further object of the present invention to provide a process for the preparation of a glass container in a glass processing machine, particularly for the preparation of glass vials, which allows the preparation of glass vials with a reduced manufacturing tolerance compared to the process known from the prior art, particularly with a reduced manufacturing tolerance with respect to the bottom geometry, more particularly with respect to the homogeneity of the thickness of the glass in the bottom region. Moreover, the process should be characterized in that the final bottom geometry, particularly the homogeneity of the thickness of glass in the bottom region, does not primarily depend on the skills of the craftsman that operates the glass processing machine and in that the bottom geometries do not significantly differ from hour to hour, from shift to shift or from lot to lot. Moreover, the glass containers obtained by such a process should be characterized in that they can be inspected in an optical inspection machine with a reduced number of vials that are ejected because the result obtained by optical inspection of that vial cannot be interpreted. Moreover, the vials should display an improved hydrolytic stability compared to the glass containers obtained by the prior art processes.

A contribution to solving at least one of the objects according to the invention is made by an embodiment 1 of a process for the preparation of a glass container from a glass tube in a glass processing machine, wherein the glass tube includes a first portion with a first end, a second portion with a second end and a longitudinal axis $L_{tube}$ that passes through the centre of the first and the second end, wherein the glass processing machine includes a plurality of processing stations and pairs of first and second clamping chucks which are adapted and arranged to hold the glass tube while rotating the glass tube around its longitudinal axis $L_{tube}$ and to transport the rotating glass tube from one glass container processing station to the next one, wherein the first clamping chucks hold the glass tube at first portion and the second clamping chucks hold the glass tube at the second portion, wherein the process includes the steps of heating the glass tube at a defined position between the first portion and the second portion by means of at least one separation gas burner to a temperature above the glass transition temperature, preferably above its softening temperature, while the glass tube is rotating around its longitudinal axis $L_{tube}$; pulling apart the first portion and the second portion of the heated glass tube, while the heated glass tube is still rotating around its longitudinal axis $L_{tube}$, in a direction that is substantially parallel to the longitudinal axis $L_{tube}$ by moving the first and the second clamping chucks away from each other, thereby forming a glass thread and separating the first portion from the second portion by pulling apart the glass thread, the part of the mass of the glass thread that remains at a portion of the glass tube forming a circular bottom at one end of that portion; characterized in that, while moving away the first and the second clamping chucks in process step III), at least one separation gas burner follows at least one portion of the glass tube selected from the first portion and the second portion in a direction that is substantially parallel to the direction in which the first and the second clamping chucks are moved away from each other, the at least one separation gas burner thereby following the one end of at least one portion of the glass tube selected from the first portion and the second portion.

Surprisingly, it has been discovered that—if at least one separation gas burner follows at least one portion of the glass tube in the separation process—an advantageous bottom geometry of the glass container can be obtained, compared to the bottom geometry obtained in a prior art process in which the separation gas burner remains in a fixed position. The present invention thus simplifies the production of vials by creating the required bottom geometry during the separation process and thereby enables a new, unprecedented quality of the bottom geometry that is ideal for automated inspection processes, both unfilled and filled. The process according to the present invention also does not further deteriorate the hydrolysis resistance of the container (i.e., the surface alkalinity is not further increased) and it considerably enhances chemical hardenability since sodium depletion no longer occurs. Finally, the process according to the present invention in principle makes the B-wreath used in the prior art process superfluous.

As used herein, the phrase "softening temperature" of the glass is the temperature at which the glass has a viscosity (determined according to ISO 7884-6:1987) of $10^{7.6}$ dPa×sec.

In an embodiment 2 of the process 1 according to the invention, process 1 is designed according to its embodiment 1, wherein in process step II) two diametrically opposed separation gas burners are used which are arranged such that the glass tube rotates centrally between the two flames generated by these two separation gas burners.

In an embodiment 3 of the process 1 according to the invention, process 1 is designed according to its embodiment 1 or 2, wherein the first and second clamping chucks are adapted and arranged to hold the glass tube in a vertical position; wherein the first portion of the glass tube corresponds to the lower portion of the glass tube having a lower end and the second portion of the glass tube corresponds to the upper portion of the glass tube having an upper end; wherein the first clamping chucks are arranged as upper clamping chucks holding the upper portion of the glass tube and the second clamping chucks are arranged as lower clamping chucks holding the lower part of the glass tube; wherein in process step III) the lower portion of the glass tube is pulled downwards by moving downwards the lower clamping chucks and wherein, while pulling downwards the lower portion, the at least one separation gas burner is moved downwards in a direction that is substantially parallel to the direction in which the lower clamping chucks are moved downwards, the at least one separation gas burner thereby following the upper end of the lower portion.

In an embodiment 4 of the process 1 according to the invention, process 1 is designed according to its embodiment 3, wherein in process step III) the lower clamping chucks are moved downwards at a point of time t and the at least one separation gas burner is moved downwards at a point of time $t'=t+\Delta t$.

In an embodiment 5 of the process 1 according to the invention, process 1 is designed according to its embodiment 4, wherein $\Delta t=0$ sec. In this particular embodiment of the process according to the present invention the at least one separation gas burner and the lower clamping chucks (and thus also the lower portion of the glass tube) are moved downwards simultaneously.

In an embodiment 6 of the process 1 according to the invention, process 1 is designed according to its embodiment 4, wherein $\Delta t$ is in the range from 0.01 to 1.0 sec, preferably in the range from 0.03 to 0.8 sec, more preferably in the range from 0.05 to 0.4 sec and even more preferably in the range from 0.1 to 0.2 sec.

In an embodiment 7 of the process 1 according to the invention, process 1 is designed according to anyone of its embodiments 2 to 6, wherein in process step III) the at least one separation gas burner is moved downwards starting from a position $Y'_0$ to a stop position $Y'_{stop}$ and the lower clamping chucks is moved downwards starting from a position $Y_0$ and, preferably after the at least one separation gas burner has stopped at position $Y'_{stop}$, to stop at a position $Y_{stop}$.

In an embodiment 8 of the process 1 according to the invention, the process 1 is designed according to its embodiment 7, wherein $|Y'_{stop}-Y'_0|<|Y_{stop}-Y_0|$. According to this embodiment it is thus preferred that the distance with which the at least one separation gas burner is moved downwards is smaller than the distance with which the lower clamping chucks are moved downward.

In an embodiment 9 of the process 1 according to the invention, the process 1 is designed according to its embodiment 8, wherein $(|Y'_{stop}-Y'_0|/|Y_{stop}-Y_0|)$ (i. e. the ratio of the distance with which the burner has been moved downwards to the distance with which the lower clamping chucks have been moved downwards) is in the range from 0.1 to 1, preferably in the range from 0.2 to 0.95, more preferably in the range from 0.3 to 0.9, even more preferably in the range from 0.4 to 0.85, even more preferably in the range from 0.5 to 0.8 and most preferably in the range from 0.6 to 0.75.

In an embodiment 10 of the process 1 according to the invention, process 1 is designed according to anyone of its embodiments 2 to 9, wherein the downward movements of the at least one separation gas burner and the lower clamping chucks are independent from each other. In this context it is particularly preferred that the downward movements of the at least one separation gas burner and the lower clamping chucks are accomplished through independent servo drives.

In an embodiment 11 of the process 1 according to the invention, process 1 is designed according to anyone of its embodiments 2 to 10, wherein the downward movements of the at least one separation gas burner and the lower clamping chucks are both linear synchronous with each other.

In an embodiment 12 of the process 1 according to the invention, process 1 is designed according to anyone of its embodiments 2 to 11, wherein the distance between the at least one separation gas burner and the upper end of the lower portion is kept constant when the at least one separation gas burner follows the upper end of the lower portion.

In an embodiment 13 of the process 1 according to the invention, process 1 is designed according to anyone of its embodiments 2 to 12, wherein the outer surface of the upper end of the lower portion does not come into contact with any part of the glass processing machine while the final shape of the circular glass bottom is formed.

In an embodiment 14 of the process 1 according to the invention, process 1 is designed according to anyone of its embodiments 2 to 13, wherein after process step III) in a further process step IV) the thickness of the glass in the circular glass bottom is equalized by heating the circular glass bottom, while still having a temperature above the glass transition temperature and while still rotating the lower portion of the glass tube around its longitudinal axis $L_{tube}$, with at least one bottom shaping gas burner, thereby forming the final shape of the circular glass bottom.

In an embodiment 15 of the process 1 according to the invention, process 1 is designed according to anyone of its embodiments 2 to 13, wherein after process step III) in a further process step IV) the thickness of the glass in the circular glass bottom is equalized by bringing the outer surface of the circular glass bottom, while still having a temperature above the glass transition temperature and while still rotating the lower portion of the glass tube around its longitudinal axis $L_{tube}$, into contact with a molding tool, thereby forming the final shape of the circular glass bottom.

In an embodiment 16 of the process 1 according to the invention, process 1 is designed according to anyone of its embodiments 2 to 13, wherein after process step III) in a further process step IV) the thickness of the glass in the circular glass bottom is equalized by heating the circular glass bottom, while still having a temperature above the glass transition temperature and while still rotating the lower portion of the glass tube around its longitudinal axis $L_{tube}$, with at least one bottom shaping gas burner, followed by a process step of bringing the outer surface of the circular glass bottom, while still having a temperature above the glass transition temperature and while still rotating the lower portion of the glass tube around its longitudinal axis $L_{tube}$, into contact with a molding tool, thereby forming the final shape of the circular glass bottom.

In an embodiment 17 of the process 1 according to the invention, process 1 is designed according to anyone of its embodiments 14 to 16, wherein the process includes the further process step of heating the lower portion of the glass tube at the lower end by means of at least one further gas burner to a temperature above its glass transition temperature while rotating the glass tube around its longitudinal axis $L_{tube}$ and forming an orifice, preferably an orifice in the form of a flange or a rolled rim, at the lower end of the glass tube, wherein the processing stations of the glass processing machine are arranged along at least one circle, wherein the glass tube is passed along this circle from one processing station to the next one while rotating around its longitudinal axis $L_{tube}$, and wherein process steps I) to IV) are all carried out at processing stations which are arranged within the same circle.

A contribution to solving at least one of the objects according to the invention is made by an embodiment 1 of a glass container 1 obtainable by process 1 of the invention according to any of its embodiments 1 to 17.

In an embodiment 2 of the glass container 1 according to the invention, glass container 1 is designed according to its embodiment 1, wherein for any cut surface of the circular glass bottom that is obtainable by cutting the circular glass bottom in a plane that includes the longitudinal axis $L_{tube}$ the following condition is fulfilled: $d_{max}/d_{tube} \times (d_{max}/d_{min}-1) \leq 1.1$; preferably $d_{max}/d_{tube} \times (d_{max}/d_{min}-1) \leq 1.0$; more preferably $d_{max}/d_{tube} \times (d_{max}/d_{min}-1) \leq 0.9$; even more preferably $d_{max}/d_{tube} \times (d_{max}/d_{min}-1) \leq 0.8$; even more preferably $d_{max}/d_{tube} \times (d_{max}/d_{min}-1) \leq 0.7$; even more preferably $d_{max}/d_{tube} \times (d_{max}/d_{min}-1) \leq 0.6$; even more preferably $d_{max}/d_{tube} \times (d_{max}/d_{min}-1) \leq 0.5$; even more preferably $d_{max}/d_{tube} \times (d_{max}/d_{min}-1) \leq 0.4$; even more preferably $d_{max}/d_{tube} \times (d_{max}/d_{min}-1) \leq 0.3$; even more preferably $d_{max}/d_{tube} \times (d_{max}/d_{min}-1) \leq 0.2$; most preferably $d_{max}/d_{tube} \times (d_{max}/d_{min}-1) \leq 0.1$; wherein $d_{tube}$ corresponds to the glass thickness of the glass tube and $D_{tube}$ corresponds to the inner diameter of the glass tube; and wherein $d_{max}$ corresponds to the maximum glass thickness of the circular glass bottom and $d_{min}$ to the minimum glass thickness of the circular glass bottom as determined within a given cut surface within the range from $x=-0.5 \times D_{tube}/2$ to $x=+0.5 \times D_{tube}/2$, the centre of the circular glass bottom being at position $x=0$, wherein $d_{min}$ and $d_{max}$ are both measured in a direction that is parallel to the longitudinal axis $L_{tube}$.

In an embodiment 3 of the glass container 1 according to the invention, glass container 1 is designed according to its embodiment 1 or 2, wherein $d_{max}$ and $d_{min}$ are determined within a given cut surface within the range from $x=-0.65 \times D_{tube}/2$ to $x=+0.65 \times D_{tube}/2$.

In an embodiment 4 of the glass container 1 according to the invention, glass container 1 is designed according to anyone of its embodiments 1 to 3, wherein $d_{max}$ and $d_{min}$ are determined within a given cut surface within the range from $x=-0.75 \times D_{tube}/2$ to $x=+0.75 \times D_{tube}/2$.

In an embodiment 5 of the glass container 1 according to the invention, glass container 1 is designed according to anyone of its embodiments 1 to 4, wherein $d_{max}$ and $d_{min}$ are determined within a given cut surface within the range from $x=-0.85 \times D_{tube}/2$ to $x=+0.85 \times D_{tube}/2$.

A contribution to solving at least one of the objects according to the invention is made by an embodiment 1 of a glass container 2 including as container parts a glass body in the form of a glass tube with a first end and a further end, the glass body being characterized by glass thickness $d_{tube}$, an inner diameter $D_{tube}$ and a longitudinal axis $L_{tube}$ that passes through the centre of the first and the further end; a circular glass bottom that closes the glass body at the first end; wherein for any cut surface of the circular glass bottom that is obtainable by cutting the circular glass bottom in a plane that includes the longitudinal axis $L_{tube}$ the following condition is fulfilled: $d_{max}/d_{tube} \times (d_{max}/d_{min}-1) \leq 1.1$; preferably $d_{max}/d_{tube} \times (d_{max}/d_{min}-1) \leq 1.0$; more preferably $d_{max}/d_{tube} \times (d_{max}/d_{min}-1) \leq 0.9$; even more preferably $d_{max}/d_{tube} \times (d_{max}/d_{min}-1) \leq 0.8$; even more preferably $d_{max}/d_{tube} \times (d_{max}/d_{min}-1) \leq 0.7$; even more preferably $d_{max}/d_{tube} \times (d_{max}/d_{min}-1) \leq 0.6$; even more preferably $d_{max}/d_{tube} \times (d_{max}/d_{min}-1) \leq 0.5$; even more preferably $d_{max}/d_{tube} \times (d_{max}/d_{min}-1) \leq 0.4$; even more preferably $d_{max}/d_{tube} \times (d_{max}/d_{min}-1) \leq 0.3$; even more preferably $d_{max}/d_{tube} \times (d_{max}/d_{min}-1) \leq 0.2$; most preferably $d_{max}/d_{tube} \times (d_{max}/d_{min}-1) \leq 0.1$; wherein $d_{tube}$ corresponds to the glass thickness of the glass tube and $D_{tube}$ corresponds to the inner diameter of the glass tube; and wherein $d_{max}$ corresponds to the maximum glass thickness of the circular glass bottom and $d_{min}$ to the minimum glass thickness of the circular glass bottom as determined within a given cut surface within the range from $x=-0.5 \times D_{tube}/2$ to $x=+0.5 \times D_{tube}/2$, the centre of the circular glass bottom being at position $x=0$, wherein $d_{min}$ and $d_{max}$ are both measured in a direction that is parallel to the longitudinal axis $L_{tube}$.

A contribution to solving at least one of the objects according to the invention is made by an embodiment 1 of a plurality 1 of glass containers, each glass container including as container parts a glass body in the form of a glass tube with a first end and a further end, the glass body being characterized by glass thickness $d_{tube}$, an inner diameter $D_{tube}$ and a longitudinal axis $L_{tube}$ that passes through the centre of the first and the further end; a circular glass bottom that closes the glass body at the first end; wherein for at least 90%, preferably for at least 95%, more preferably for at least 99% and most preferably for 100% of the glass containers in the plurality of glass containers the following condition is fulfilled: for any cut surface of the circular glass bottom that is obtainable by cutting the circular glass bottom in a plane that includes the longitudinal axis $L_{tube}$ the following condition is fulfilled: $d_{max}/d_{tube} \times (d_{max}/d_{min}-1) \leq 1.1$; preferably $d_{max}/d_{tube} \times (d_{max}/d_{min}-1) \leq 1.0$; more preferably $d_{max}/d_{tube} \times (d_{max}/d_{min}-1) \leq 0.9$; even more preferably $d_{max}/d_{tube} \times (d_{max}/d_{min}-1) \leq 0.8$; even more preferably $d_{max}/d_{tube} \times (d_{max}/d_{min}-1) \leq 0.7$; even more preferably $d_{max}/d_{tube} \times (d_{max}/d_{min}-1) \leq 0.6$; even more preferably $d_{max}/d_{tube} \times (d_{max}/d_{min}-1) \leq 0.5$; even more preferably $d_{max}/d_{tube} \times (d_{max}/d_{min}-1) \leq 0.4$; even more preferably $d_{max}/d_{tube} \times (d_{max}/d_{min}-1) \leq 0.3$; even more preferably $d_{max}/d_{tube} \times (d_{max}/d_{min}-1) \leq 0.2$; most preferably $d_{max}/d_{tube} \times (d_{max}/d_{min}-1) \leq 0.1$; wherein $d_{tube}$ corresponds to the glass thickness of the glass tube and $D_{tube}$ corresponds to the inner diameter of the glass tube; and wherein $d_{max}$ corresponds to the maximum glass thickness of the circular glass bottom and $d_{min}$ to the minimum glass thickness of the circular glass bottom as determined within a given cut surface within the range from $x=-0.5 \times D_{tube}/2$ to $x=+0.5 \times D_{tube}/2$, the centre of the circular glass bottom being at position $x=0$, wherein $d_{min}$ and $d_{max}$ are both measured in a direction that is parallel to the longitudinal axis $L_{tube}$.

As used herein, the phrase "a plurality of glass containers" in the sense of the present invention preferably includes at least 10 glass containers, preferably at least 25 glass containers, more preferably at least 50 glass containers, even more preferably at least 75 glass containers and most preferably at least 100 glass containers. Furthermore, the plurality of glass containers preferably has been collected arbitrarily and particularly has not been selected with regard to any property. For example, the plurality of glass containers may be the group of containers which are packed together in a typical transport tray.

In an embodiment 2 of the glass container 2 according to the invention or in an embodiment 2 of the plurality 1 of glass containers according to the invention, glass container 2 or each glass container contained in the plurality 1 of glass containers is designed according to it embodiment 1, wherein $d_{max}$ and $d_{min}$ are determined within a given cut surface within the range from $x=-0.65 \times D_{tube}/2$ to $x=+0.65 \times D_{tube}/2$.

In an embodiment 3 of the glass container 2 according to the invention or in an embodiment 3 of the plurality 1 of glass containers according to the invention, glass container 2 or each glass container contained in the plurality 1 of glass containers is designed according to it embodiment 1 or 2, wherein $d_{max}$ and $d_{min}$ are determined within a given cut surface within the range from $x=-0.75 \times D_{tube}/2$ to $x=+0.75 \times D/2$ tube/2.

In an embodiment 4 of the glass container 2 according to the invention or in an embodiment 4 of the plurality 1 of glass containers according to the invention, glass container 2 or each glass container contained in the plurality 1 of glass containers is designed according to anyone of its embodiments 1 to 3, wherein $d_{max}$ and $d_{min}$ are determined within a given cut surface within the range from $x=-0.85 \times D_{tube}/2$ to $x=+0.85 \times D_{tube}/2$.

In an embodiment 5 of the glass container 2 according to the invention or in an embodiment 5 of the plurality 1 of glass containers according to the invention, glass container 2 or each glass container contained in the plurality 1 of glass containers is designed according to anyone of its embodiments 1 to 4, wherein the glass container 2 or each glass container contained in the plurality 1 of glass containers has a mass of glass $m_g$ and an interior volume $V_i$ and wherein the following condition is fulfilled: $m_g/V_i^{0.75}<2.0$, preferably $m_g/V_i^{0.75}<1.75$.

In an embodiment 6 of the glass container 2 according to the invention or in an embodiment 6 of the plurality 1 of glass containers according to the invention, glass container 2 or each glass container contained in the plurality 1 of glass containers is designed according to anyone of its embodiments 1 to 5, wherein the glass container 2 or each glass container contained in the plurality 1 of glass containers has an interior volume $V_i$ in a range from 2 to 150 ml, preferably from 3 to 100 ml, more preferably from 3 to 50 ml, even more preferably from 3 to 15 ml, most preferably from 3 to 7 ml.

In an embodiment 7 of the glass container 2 according to the invention or in an embodiment 7 of the plurality 1 of glass containers according to the invention, glass container 2 or each glass container contained in the plurality 1 of glass containers is designed according to anyone of its embodiments 1 to 6, wherein the glass container 2 or each glass container contained in the plurality 1 of glass containers has a height $h_c$ in the range from 15 to 100 mm, preferably in the range from 20 to 60 mm, more preferably in the range from 25 to 55 mm, even more preferably in the range from 30 to 50 mm and most preferably in the range from 34 to 46 mm.

In an embodiment 8 of the glass container 2 according to the invention or in an embodiment 8 of the plurality 1 of glass containers according to the invention, glass container 2 or each glass container contained in the plurality 1 of glass containers is designed according to anyone of its embodiments 1 to 7, wherein the glass container 2 or each glass container contained in the plurality 1 of glass containers is a packaging container for a medical or a pharmaceutical packaging good or both. A preferred pharmaceutical packaging good is a pharmaceutical composition. Preferably, the glass container 1 is suitable for packaging parenteralia in accordance with section 3.2.1 of the European Pharmacopoeia, 7th edition from 2011.

In an embodiment 9 of the glass container 2 according to the invention or in an embodiment 9 of the plurality 1 of glass containers according to the invention, glass container 2 or each glass container contained in the plurality 1 of glass containers is designed according to anyone of its embodiments 1 to 9, wherein the glass container 2 or each glass container contained in the plurality 1 of glass containers is a vial.

A contribution to solving at least one of the objects according to the invention is made by an embodiment 1 of a glass processing machine 1 including a plurality of glass container processing stations and pairs of first and second clamping chucks which are adapted and arranged to hold a glass tube including a first portion with a first end, a second portion with a second end and having a longitudinal axis $L_{tube}$ that passes through the centre of the first and the second end, while rotating the glass tube around its longitudinal axis $L_{tube}$ and which are adapted and arranged to transport the rotating glass tube from one glass container processing station to the next one, wherein the glass processing machine includes, as one of the processing stations, a glass tube separation station that includes at least one separation gas burner adapted and arranged to heat the glass tube at a defined position between the first portion and the second portion to a temperature above the glass transition temperature, preferably above the softening temperature, while rotating the glass tube around its longitudinal axis $L_{tube}$, wherein the first and second clamping chucks are adapted and arranged in such a manner that they can be moved away from each other, thereby pulling apart the first portion and the second portion of the heated glass tube to separate the first portion from the second portion, characterized in that the at least one separation gas burner and at least one clamping chuck selected from the first clamping chuck and the second clamping chuck are adapted and arranged such that they can be moved in the same direction when the first and second clamping chucks are moved away from each other.

In an embodiment 2 of the glass processing machine 1 according to the invention, glass processing machine 1 is designed according to its embodiment 1, wherein the glass tube separation station includes two diametrically opposed separation gas burners which are arranged such that the glass tube rotates centrally between the two flames generated by these two separation gas burners.

In an embodiment 3 of the glass processing machine 1 according to the invention, glass processing machine 1 is designed according to its embodiment 1 or 2, wherein the first and second clamping chucks are adapted and arranged to hold the glass tube in a vertical position; wherein the first clamping chucks are arranged as upper clamping chucks and the second clamping chucks are arranged as lower clamping chucks; wherein the lower clamping chucks are adapted and arranged such that they can be moved downwards in order to pull apart the lower portion and the upper portion of the heated glass tube; wherein the at least one separation gas burner and the lower clamping chuck are adapted and arranged such that they can be moved in the same direction when the upper clamping chucks are moved downwards.

In an embodiment 4 of the glass processing machine 1 according to the invention, glass processing machine 1 is designed according to its embodiment 3, wherein the at least one separation gas burner and the lower clamping chuck are adapted and arranged in such a manner that the lower clamping chucks can be moved downwards at a point of time t and the at least one separation gas burner can be moved downwards at a point of time $t'=t+\Delta t$.

In an embodiment 5 of the glass processing machine 1 according to the invention, glass processing machine 1 is designed according to its embodiment 4, wherein $\Delta t=0$ sec. In this particular embodiment of the glass processing machine according to the present invention the at least one separation gas burner and the lower clamping chucks can be moved downwards simultaneously.

In an embodiment 6 of the glass processing machine 1 according to the invention, glass processing machine 1 is designed according to its embodiment 5, wherein $\Delta t$ is in the range from 0.01 to 1.0 sec, preferably in the range from 0.03 to 0.8 sec, more preferably in the range from 0.05 to 0.4 sec and even more preferably in the range from 0.1 to 0.2 sec.

In an embodiment 7 of the glass processing machine 1 according to the invention, glass processing machine 1 is designed according to anyone of its embodiments 3 to 6, wherein the at least one separation gas burner and the lower clamping chuck are adapted and arranged in such a manner that the at least one separation gas can be moved downwards starting from a position $Y'_0$ to a stop position $Y'_{stop}$ and that the lower clamping chucks can be moved downwards starting from a position $Y_0$ and, preferably after the at least one separation gas burner has stopped at position $Y'_{stop}$, to stop at a position $Y_{stop}$.

In an embodiment 8 of the glass processing machine 1 according to the invention, glass processing machine 1 is designed according to its embodiment 7, wherein $|Y'_{stop}-Y'_0|<|Y_{stop}-Y_0|$.

In an embodiment 9 of the glass processing machine 1 according to the invention, glass processing machine 1 is designed according to its embodiment 8, wherein $(|Y'_{stop}-Y'_0|/|Y_{stop}-Y_0|)$ is in the range from 0.1 to 1, preferably in the range from 0.2 to 0.95, more preferably in the range from 0.3 to 0.9, even more preferably in the range from 0.4 to 0.85, even more preferably in the range from 0.5 to 0.8 and most preferably in the range from 0.6 to 0.75.

In an embodiment 10 of the glass processing machine 1 according to the invention, glass processing machine 1 is designed according to anyone of its embodiments 3 to 9, wherein the at least one separation gas burner and the lower clamping chuck are adapted and arranged in such a manner that they can be moved downwards independently from each other. In this context it is particularly preferred that the glass processing machine includes independent servo drives by means of which this independent downward movement can be accomplished.

In an embodiment 11 of the glass processing machine 1 according to the invention, glass processing machine 1 is designed according to anyone of its embodiments 3 to 10, wherein the at least one separation gas burner and the lower clamping chuck are adapted and arranged in such a manner that they can be moved downwards linear and synchronous with each other.

In an embodiment 12 of the glass processing machine 1 according to the invention, glass processing machine 1 is designed according to anyone of its embodiments 3 to 11, wherein the at least one separation gas burner and the lower clamping chuck are adapted and arranged in such a manner that the distance between the at least one separation gas burner and the upper end of the lower portion can be kept constant when the at least one separation gas burner and the lower clamping chuck are moved simultaneously in the same direction.

In an embodiment 13 of the glass processing machine 1 according to the invention, glass processing machine 1 is designed according to anyone of its embodiments 3 to 12, wherein the glass processing machine includes, as a further processing station, at least one bottom shaping station in which the final shape of the circular glass bottom is formed, the at least one bottom shaping station including at least one bottom shaping gas burner and/or at least one molding tool.

In an embodiment 14 of the glass processing machine 1 according to the invention, glass processing machine 1 is designed according to its embodiment 13, wherein the glass processing machine includes, as a further processing station, at least one orifice forming station for the formation of an orifice, preferably an orifice in the form of a flange or a rolled rim, at the lower end of the glass tube, wherein the processing stations of the glass processing machine are arranged along at least one circle, wherein a glass tube that is held by means of the upper and lower clamping chucks can be passed along this circle from one processing station to the next one while rotating about its longitudinal axis $L_{tube}$, and wherein the glass tube separation station, the at least one bottom shaping station and the at least one orifice forming station are all located within the same circle.

Glass Container

The glass container according to the invention or the glass container contained in the plurality of glass containers according to the invention may have any size or shape which the skilled person deems appropriate in the context of the invention. Preferably, the top region of the glass container includes an opening, which allows for inserting a pharmaceutical composition into the interior volume of the glass container. The glass container includes as container parts a glass body in the form of a glass tube with a first end and a further end and a circular glass bottom that closes the glass body at the first end. Preferably, the glass container is of a one-piece design that is prepared by providing a glass tube and by shaping one end thereof (i. e. the end that will be the opening of the glass container) so as to obtain a top region, a junction region, a neck region and a shoulder region followed by a step of shaping the further end of the glass tube so as to obtain a closed glass bottom. A preferred glass container is a pharmaceutical glass container, more preferably one selected from the group consisting of a vial, an ampoule or a combination thereof, wherein a vial is particularly preferred.

For the use in this document, the interior volume $V_i$ represents the full volume of the interior of the glass container. This volume may be determined by filling the interior of the glass container with water up to the brim and measuring the volume of the amount of water which the interior can take up to the brim. Hence, the interior volume as used herein is not a nominal volume as it is often referred to in the technical field of pharmacy. This nominal volume may for example be less than the interior volume by a factor of about 0.5.

Glass

The glass of the container may be any type of glass and may consist of any material or combination of materials which the skilled person deems suitable in the context of the invention. Preferably, the glass is suitable for pharmaceutical packaging. Particularly preferable, the glass is of type I, more preferably type I b, in accordance with the definitions of glass types in section 3.2.1 of the European Pharmacopoeia, $7^{th}$ edition from 2011. Additionally, or alternatively preferable to the preceding, the glass is selected from the group consisting of a borosilicate glass, an aluminosilicate glass, soda lime glass and fused silica; or a combination of at least two thereof. For the use in this document, an aluminosilicate glass is a glass which has a content of $Al_2O_3$ of more than 8 wt.-%, preferably more than 9 wt.-%, particularly preferable in a range from 9 to 20 wt.-%, in each case based on the total weight of the glass. A preferred aluminosilicate glass has a content of $B_2O_3$ of less than 8 wt.-%, preferably at maximum 7 wt.-%, particularly preferably in a range from 0 to 7 wt.-%, in each case based on the total weight of the glass. For the use in this document, a borosilicate glass is a glass which has a content of $B_2O_3$ of at least 1 wt.-%, preferably at least 2 wt.-%, more preferably at least 3 wt.-%, more preferably at least 4 wt.-%, even more preferably at least 5 wt.-%, particularly preferable in a range from 5 to 15 wt.-%, in each case based on the total weight of the glass. A preferred borosilicate glass has a content of $Al_2O_3$ of less than 7.5 wt.-%, preferably less than 6.5 wt.-%, particularly preferably in a range from 0 to 5.5 wt.-%, in each case based on the total weight of the glass. In a further aspect, the borosilicate glass has a content of $Al_2O_3$ in a range from 3 to 7.5 wt.-%, preferably in a range from 4 to 6 wt.-%, in each case based on the total weight of the glass.

A glass which is further preferred according to the invention is essentially free from B. Therein, the phrase "essentially free from B" as used herein refers to glasses which are free from B which has been added to the glass composition by purpose. This means that B may still be present as an impurity, but preferably at a proportion of not more than 0.1 wt.-%, more preferably not more than 0.05 wt.-%, in each case based on the weight of the glass.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Determination of $d_{max}$ and $d_{min}$

The measurement of the thickness of the circular glass bottom was performed using a CHRocodile M4 high resolution measuring head (Precitec GmbH & Co. KG, Lemgo, Germany) with a measuring range of 200-3000 μm and a resolution of 0.1 μm. A step width of 0.1 mm was selected laterally.

Wall Thicknesses and Diameters

The wall thickness of the glass container at a given position as well as the inner or outer diameter of the glass container at a given position are determined in accordance with DIN ISO 8362-1.

EXAMPLE

A glass tube (Fiolax clear, Schott AG, Germany) having an outer diameter of 16 mm and a wall thickness $d_{tube}$ of 1.2 mm is loaded into the head of a rotary machine. While rotating around its major axis the glass tube is heated to its softening point with two separation gas burner as shown in FIG. 2 and the heated glass is pulled along its major axis by moving downwards the lower clamping chucks for stretching and creating a container closure in the form of a circular glass bottom. When moving downwards the lower clamping chucks, the separation gas burner are moved in the same direction as the lower clamping chucks. The ratio of the distance with which the separation gas burner have been moved downwards to the distance with which the lower clamping chucks have been moved downwards ($|Y'_{stop} - Y'_0|/|Y_{stop} - Y_0|$; see FIG. 3) was 0.72. Furthermore, the burner was moved downwards with a time offset (Δt) of 0.085 sec. In a Comparative Example representing the prior-art process the burner remains at a fixed position when the lower clamping chucks are moved downwards.

From the containers thus obtained $d_{max}$ and $d_{min}$ have been determined. The results are shown in the following table:

|   | Example according to the present invention | Comparative Example |
|---|---|---|
| $\|Y'_{stop} - Y'_0\| / \|Y_{stop} - Y_0\|$ | 0.72 | 0 |
| Δt | 0.085 sec | 0 |
| $d_{max}$ | 1.32 mm | 1.48 |
| $d_{min}$ | 0.99 mm | 0.75 |
| $d_{max}/d_{tube} \times (d_{max}/d_{min} - 1)$ | 0.37 | 1.2 |

As can be seen, an advantageous bottom geometry of the glass container (which is reflected by a more homogeneous thickness of the glass bottom) can be obtained if the separation gas burner follow the lower clamping chucks when they are moved downwards, compared to the bottom geometry obtained in a prior art process in which the separation gas burner remain in a fixed position.

DETAILED DESCRIPTION

Figure 1:
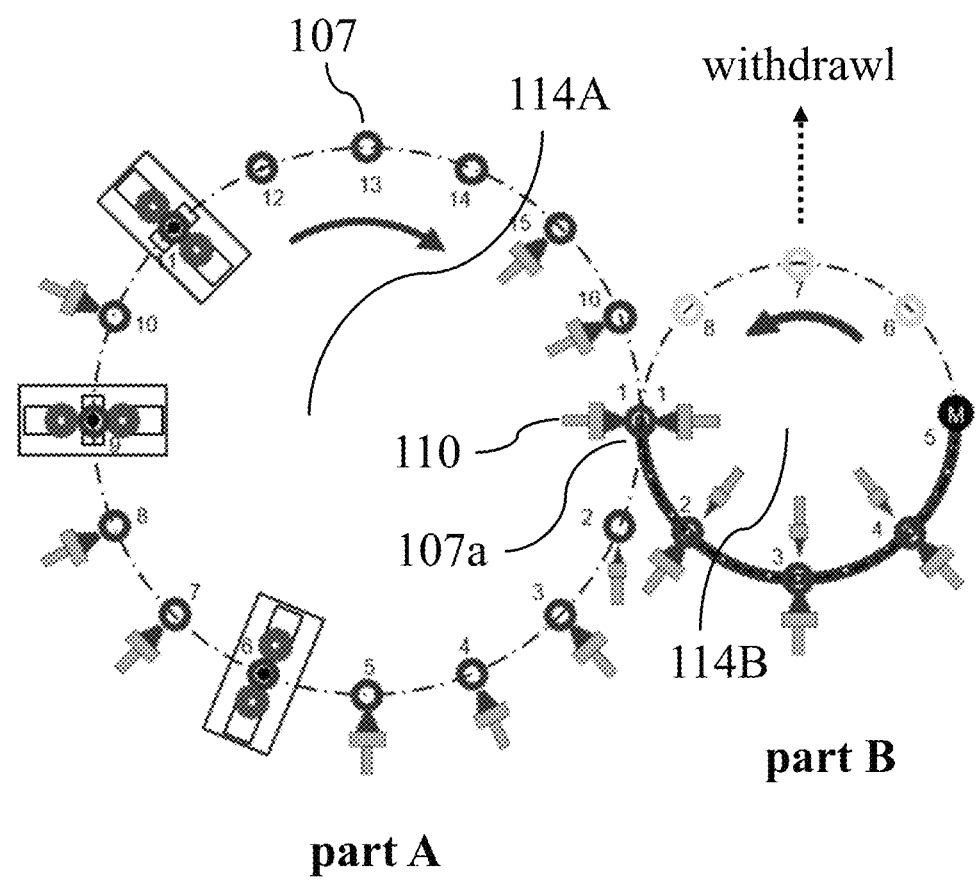
FIG. 1 shows a glass processing machine 102 known from the prior art and also illustrates a process for the preparation of glass containers known from the prior art.
Figure 2A:
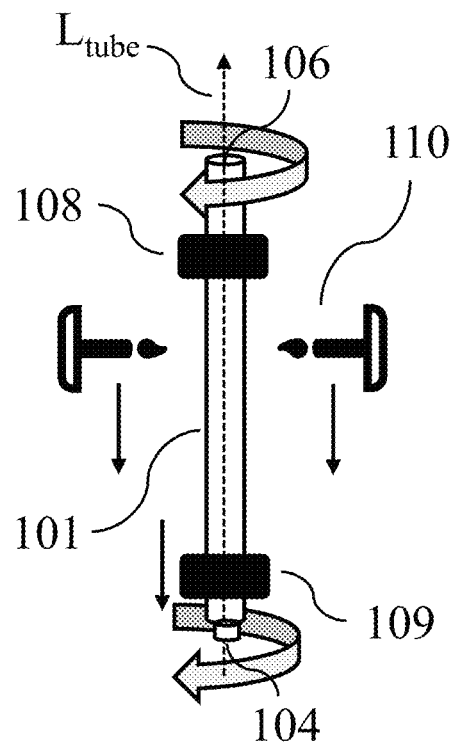
FIGS. 2A-D show the process for the preparation of a glass container 100 according to the present invention.
Figure 2B:
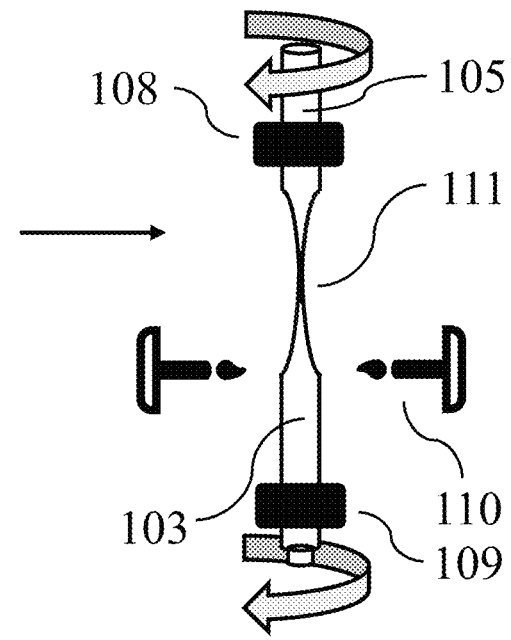
Figure 2D:
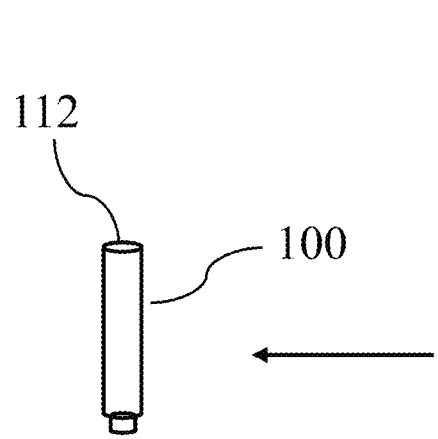
Figure 2C:
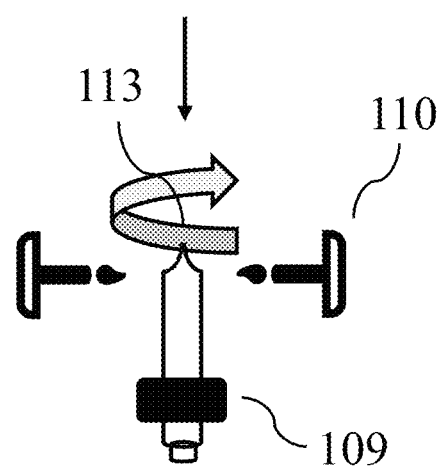

FIG. 1 shows a glass processing machine 102 known from the prior art and also illustrates a process for the preparation of glass containers known from the prior art. In such a machine both the tubes (part A: large wreath 114A) and the separated vials (part B: small wreath 114B) are held vertically in rotating chucks on two adjacent rotating rings 114A, 114B. This type of machine has the working positions (1 to 16: part A and 1 to 8: part B) arranged one after, between which the tubes and vials are transported by the wreaths in clocked fashion. Station 107a at the point that connects the two rings 114A, 114B corresponds to the separation station at which the glass tube is heated at a defined position by means of two separation gas burners 110 so far that it becomes deformable. As soon as this temperature is reached, the tube—under continuing rotation and heating by means of the burner 110—is extended in axial direction by means of a linear downwards movement of the lower chuck. Thereby the tube in the heated region extends under simultaneous tapering of its diameter, so that a constriction region in the form of a glass thread results. After the downward movement the constriction region is further heated. However, in the prior art process the separation gas burner remain at the same height when moving downwards the lower clamping chucks. After the lower portion of the glass tube has been finally separated, the glass is liquefied on positions 2 to 4 of the B-wreath 114B under massive input of heat at the upper edge of the of the lower portion of the glass tube in order to finally shape the bottom geometry.

FIGS. 2A-D show the process for the preparation of a glass container 100 according to the present invention as it can be performed, for example, at separation station 107a in a glass processing machine shown in FIG. 1. In a first process step I) the glass tube 101 having an upper portion 105 with an upper end 106 and a lower portion 103 with a lower end 104 is held by means of upper and lower clamping chucks 108, 109 in a vertical position. The glass tube is heated at a defined position between the lower and the upper part 103, 105 by means of two opposed separation gas burners 110 to a temperature above the glass transition temperature while the glass tube 101 is rotating around its longitudinal axis $L_{tube}$ (see FIG. 2A). In process step II) the lower portion 103 of the glass tube 101 is pulled downwards by moving downwards the lower clamping chucks 109 while the glass tube 101 is rotating around its longitudinal axis $L_{tube}$ (see FIG. 2B). When moving downwards the lower clamping chucks 109 and thus also the lower portion 103 of the glass tube 101, a glass thread 111 is formed (see also FIG. 2B). When further moving downwards the lower portion 103, this portion is separated from the upper portion 105 by pulling apart the glass thread 111, the part of the mass of the glass thread 111 that remains at the lower portion 103 of the glass tube 101 forming a circular bottom 112 (see FIGS. 2C and 2D). The process according to the present invention is characterized in that, while pulling downwards the lower portion 103, the at least one separation gas burner 110 does not remain at the same position as it is observed in the process known from the prior art, but is moved downwards in a direction that is substantially parallel to the direction in which the lower clamping chucks 109 are moved downwards (indicated by the arrows beneath the separation gas burners 110 in FIG. 2A), the at least one separation gas burner 110 thereby following the upper end 113 of the lower portion 103.

Figure 3:
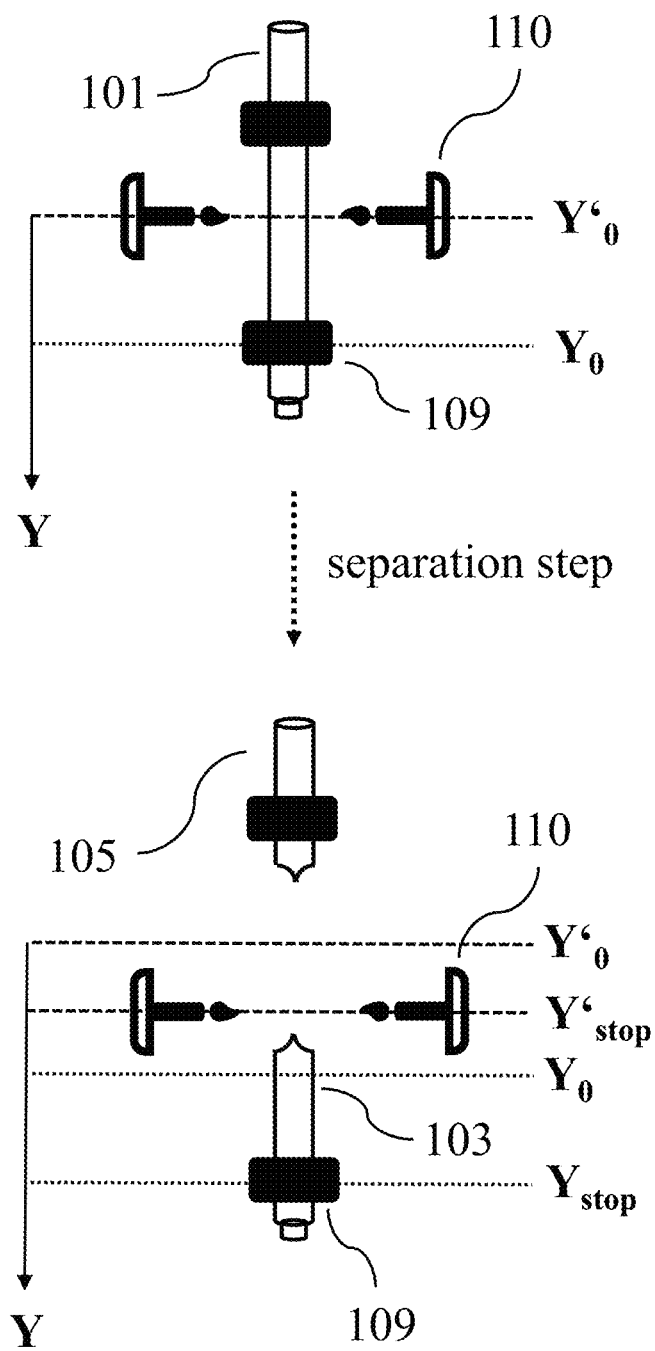
FIG. 3 shows the movement of the separation gas burners 110 and the lower clamping chucks 109 at the time at which the lower clamping chucks 109 are moved downwards.

FIG. 3 shows the movement of the separation gas burners 110 and the lower clamping chucks 109 at the time at which the lower clamping chucks 109 are moved downwards. In the embodiment of the process shown in FIG. 3, the lower clamping chucks 109 are moved downwards at a point of time t and the at least one separation gas burner 110 is moved downwards at a point of time t'=t+Δt, wherein Δt can be zero (which means that the lower clamping chucks 109 and the at least one separation gas burner 110 are moved downwards simultaneously) or Δt can be larger than zero. In this case the at least one separation gas burner 110 is moved downwards with a time delay in relation to the lower clamping chucks 109. As can also be seen in the embodiment of the process according to the present invention shown in FIG. 3, the at least one separation gas burner 110 is moved downwards starting from a position $Y'_0$ to a position $Y'_{stop}$ and the lower clamping chucks 109 start from a position $Y_0$ and, preferably after the at least one separation gas burner 110 has stopped at position $Y'_{stop}$, to stop at a position $Y_{stop}$, Y wherein $|Y'_{stop}-Y'_0|<|Y_{stop}-Y_0|$. According to this embodiment it is thus preferred that the distance with which the at least one separation gas burner 110 is moved downwards is smaller than the distance with which the lower clamping chucks 109 are moved downward.

Figure 4:
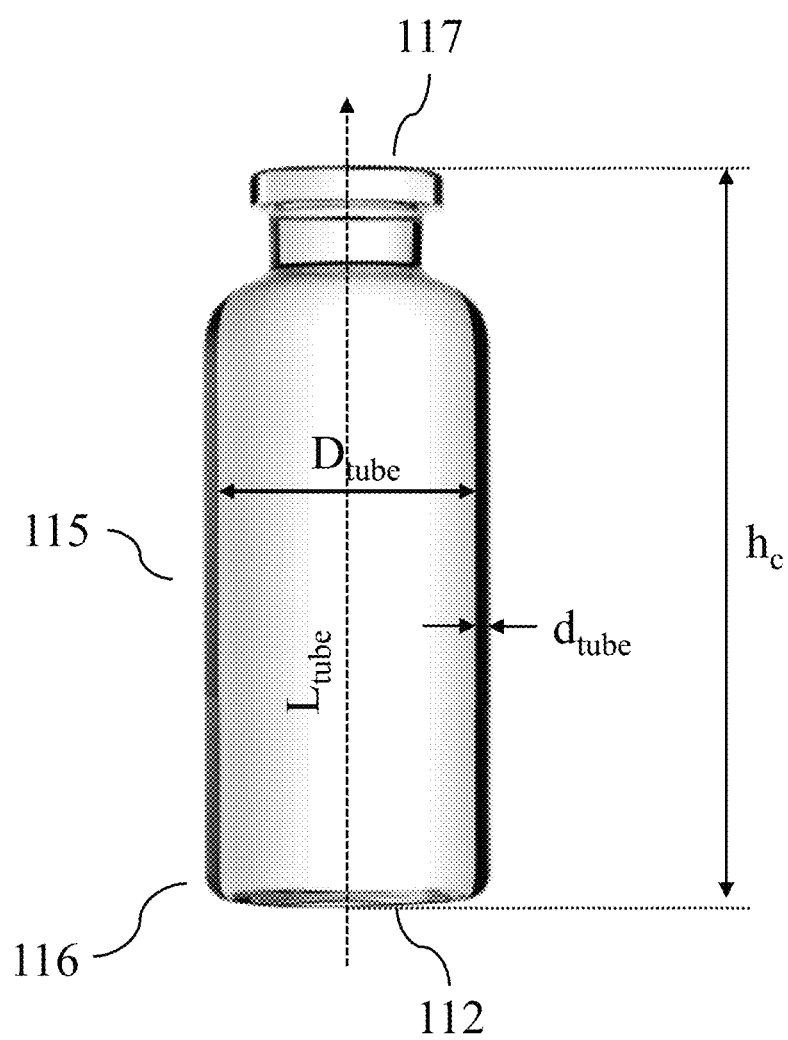
FIG. 4 shows a side view of container 100 according to the present invention.

FIG. 4 shows a side view of container 100 according to the present invention. The container 100 includes as a container part a glass body 115 in the form of a glass tube having a glass thickness $d_{tube}$ and an inner diameter $D_{tube}$ (which correspond to the thickness and the inner diameter of the glass tube 101 that has been used to prepare the container 100) with a first end 116 and a further end 117, the glass body 115 being characterized by a longitudinal axis $L_{tube}$ that passes through the centre of the first and the further end 116, 117. The glass container 100 further includes as a container part a circular glass bottom 112 that closes the glass body 115 at the first end 116. For any cut surface 118 of the circular glass bottom 112 that is obtainable by cutting the circular glass bottom 112 in a plane that includes the longitudinal axis $L_{tube}$ (see FIG. 5A) the following condition is fulfilled:

$$d_{max}/d_{tube} \times (d_{max}/d_{min}-1) \le 1.1$$

wherein $d_{max}$ corresponds to the maximum glass thickness of the circular glass bottom 112 and $d_{min}$ to the minimum glass thickness of the circular glass bottom 112 as determined within a given cut surface 118 within the range from $x=-0.5 \times D_{tube}/2$ to $x=+0.5 \times D_{tube}/2$, the centre of the circular glass bottom 112 being at position x=0, wherein and are both measured in a direction that is parallel to the longitudinal axis $L_{tube}$.

Figure 5A:
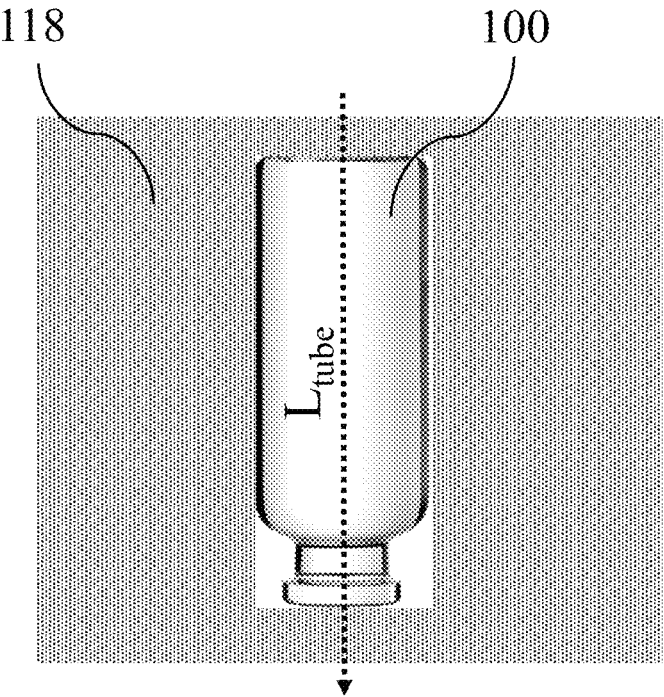
FIG. 5A shows in a side view the localization of plane 118 that is used to determine $d_{max}$ and $d_{min}$ in the circular glass bottom 112 of the glass container.

FIG. 5A shows in a side view the localization of plane 118 that is used to determine $d_{max}$ and $d_{min}$ in the bottom 112 of the glass container. Plane 118 corresponds to the plane that is centrically located in the glass container 100 and that includes the longitudinal axis $L_{tube}$ of the glass container (indicated by the dashed line in FIG. 5A), i. e. the axis that goes perpendicular through the centre of the bottom 112 (see FIG. 5B).

Figure 5B:
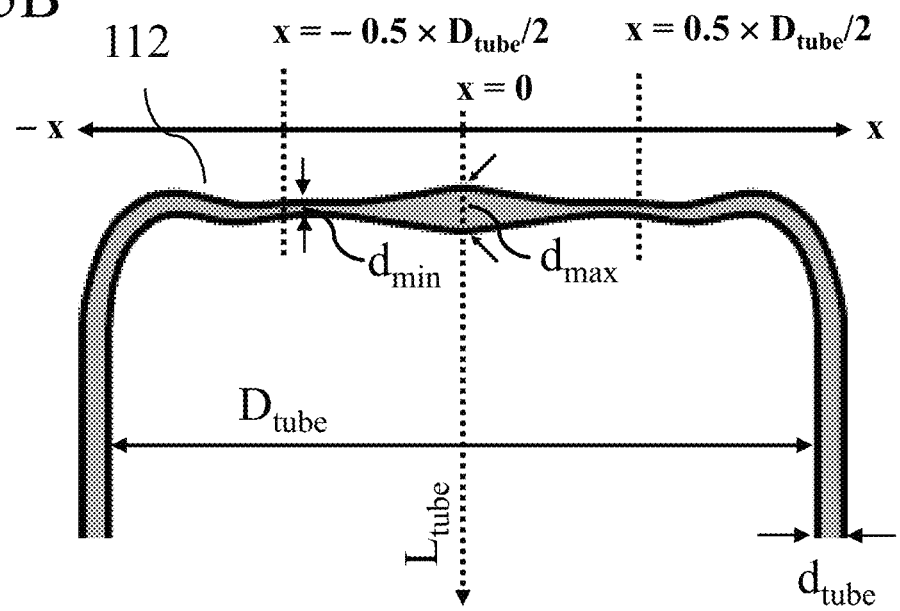
FIG. 5B shows the localization of $d_{max}$ and $d_{min}$ as well as the width of the area within which these values are to be determined in an exemplary bottom cross-section.

FIG. 5B shows the localization of $d_{max}$ and $d_{min}$ as well as the width of the area within which these values are to be determined in an exemplary bottom cross-section. As can be seen, $d_{max}$ and $d_{min}$ are determined within an area the extends over 50% of the area of the circular glass bottom, wherein the centre of this area is located in the centre of the circular glass bottom 112.

Figure 6A:
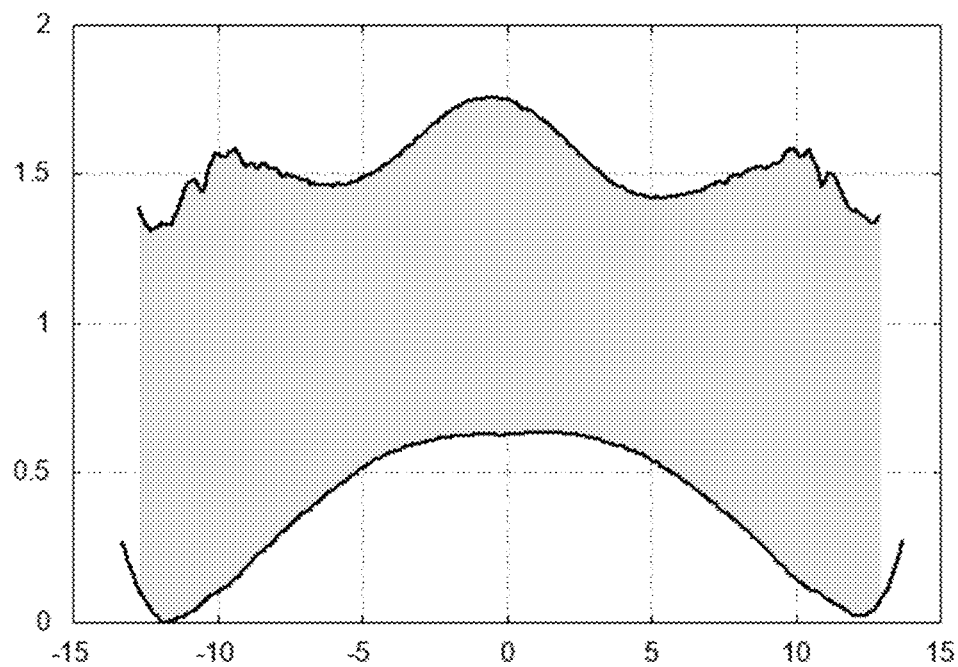
FIG. 6A shows the thickness of the glass in the circular glass bottom 112 of a glass container 100 prepared by a process known from the prior art across the whole breadth of the bottom.

FIG. 6A shows a profile of the thickness of the glass in the circular glass bottom 112 of a glass container 100 in millimeters (mm) prepared by a process known from the prior art across the whole breadth of the bottom in millimeters (mm) from the longitudinal axis $L_{tube}$, which is indicated as 0 on the x-axis. Similarly, FIG. 6B shows a profile of the thickness of the glass in the circular glass bottom 112 of a glass container 100 in millimeters (mm) prepared by a process according to the present invention in which at least one separation gas burner 110 follows at least one portion of the glass tube in the separation process across the whole breadth of the bottom in millimeters (mm) from the longitudinal axis $L_{tube}$, which is indicated as 0 on the x-axis.

Figure 6B:
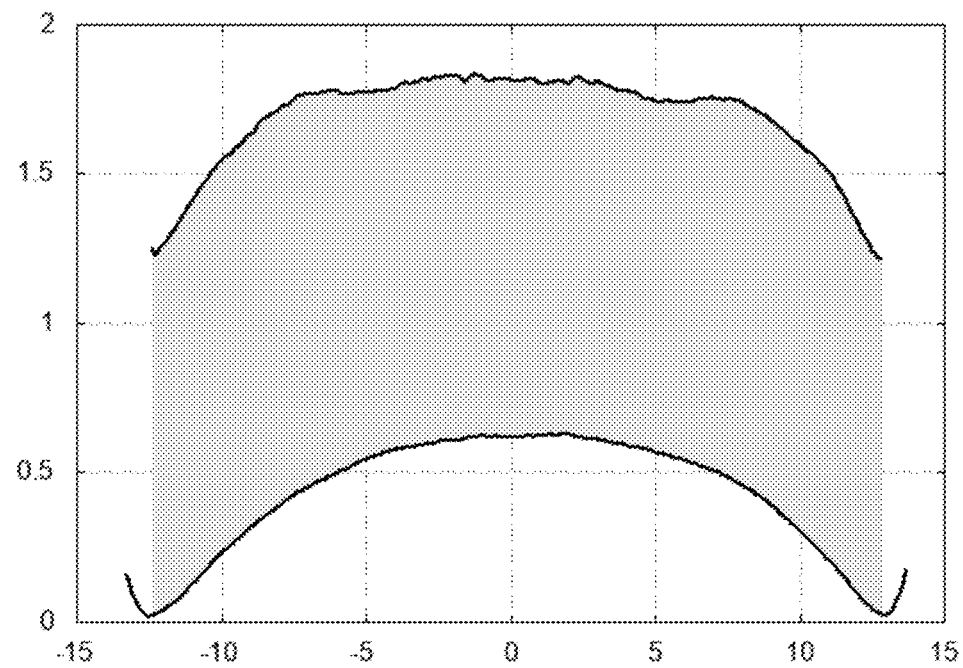
FIG. 6B shows the thickness of the glass in the circular glass bottom 112 of a glass container 100 prepared by the process according to the present invention.

As can be seen from comparing FIGS. 6A and 6B, by means of the process according to the present invention an advantageous bottom geometry of the glass container 100 can be obtained, compared to the bottom geometry obtained in a prior art process in which the separation gas burner 110 remain in a fixed position. The present invention thus enables the preparation of a new, unprecedented quality of the bottom geometry that is ideal for automated inspection processes, both unfilled and filled as the differences between the maximum and minimum value of the thickness of the glass bottom 112 (i. e. $d_{max}$ and $d_{min}$) is significantly reduced (i. e. the thickness of the glass in the circular bottom 112 is significantly more uniform over the entire area of the circular bottom 112 compared to glass containers made by the state of the art process).

Figure 7:
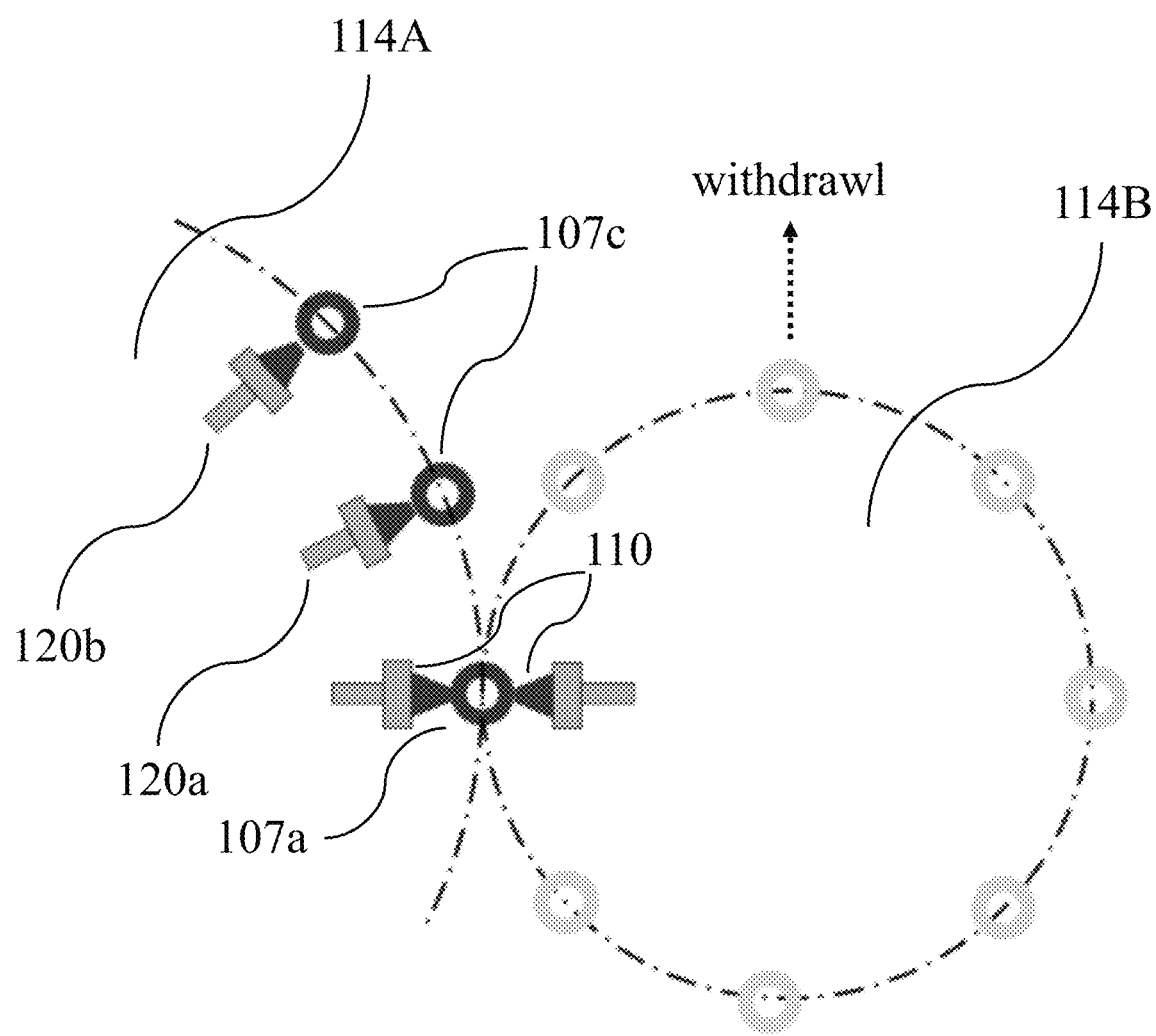
FIG. 7 shows a glass processing machine 102 according to the present invention and also illustrates the process according to the present invention.

FIG. 7 shows a glass processing machine 102 according to the present invention and also illustrates the process according to the present invention. Although in this glass processing machine two separate wreaths 114A, 114B are provided, it would also be possible to perform the process according to the present invention in a glass processing machine that includes a single wreath 114 in which both, an orifice, preferably an orifice in the form of a flange or rolled rim, at one end of the container 100 and a circular bottom 112 at the other end of the container are formed. In the glass processing machine shown in FIG. 7 the final shape of the circular glass bottom 112 of the glass container 100 is formed at separation station 107a at which the lower and upper portion 103, 105 of the glass tube 101 are separated from each other and in which the separation gas burners 110 are moved downwards together with the lower clamping chucks 109 when tearing apart the glass thread 111. In the process and device shown in FIG. 7 no additional bottom shaping gas burners 119 or molding tools 120 are provided to further shape the circular glass bottom 112 of the glass containers. In such a process the outer surface of the upper end 113 of the lower portion 103 of the glass tube 101 (i. e. the end at which the circular glass bottom 112 is formed) does not come into contact with any part of the glass processing machine 103 while the final shape of the circular glass bottom 112 is formed.

Figure 8:
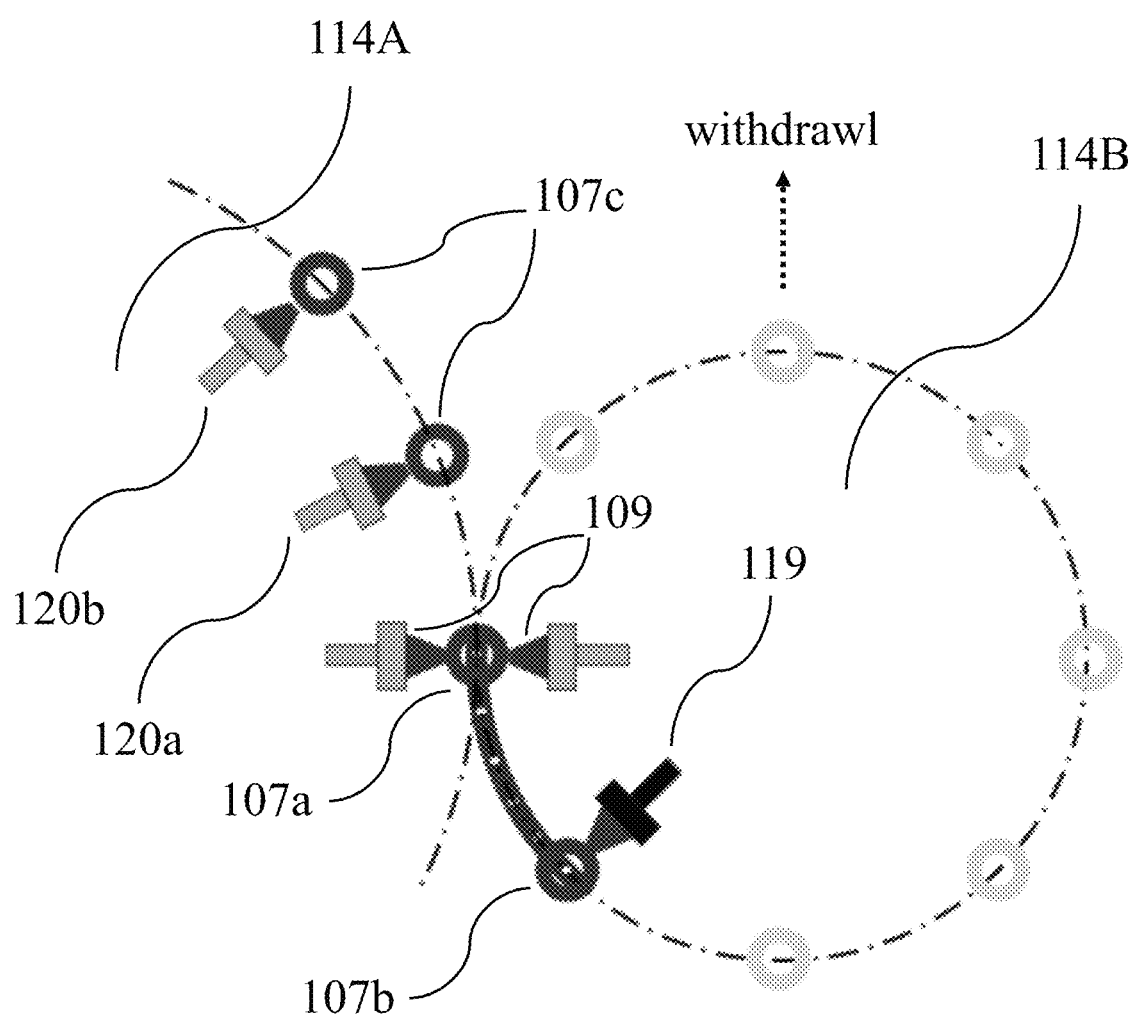
FIG. 8 shows a particular embodiment of a glass processing machine 102 according to the present invention and also illustrates a particular embodiment of the process according to the present invention.

FIG. 8 shows further a particular embodiment of a glass processing machine 102 according to the present invention and also illustrates a further particular embodiment of the process according to the present invention. Here, an additional bottom shaping gas burners 119 is provided at a further bottom shaping station 107b (in FIG. 8 this process station is located at wreath 114B, but it would also be possible to provide a single wreath 114 in which this additional bottom shaping station 107b is provided at a process station that immediately follows the separation station 107a) by means of with the final shape of the circular glass bottom 112 is further modified. The additional bottom shaping gas burner 119 is particularly useful to equalize the knots which, after the circular glass bottom has been formed at process station 107a by means of the process according to the present invention, are only slightly pronounced.

Figure 9:
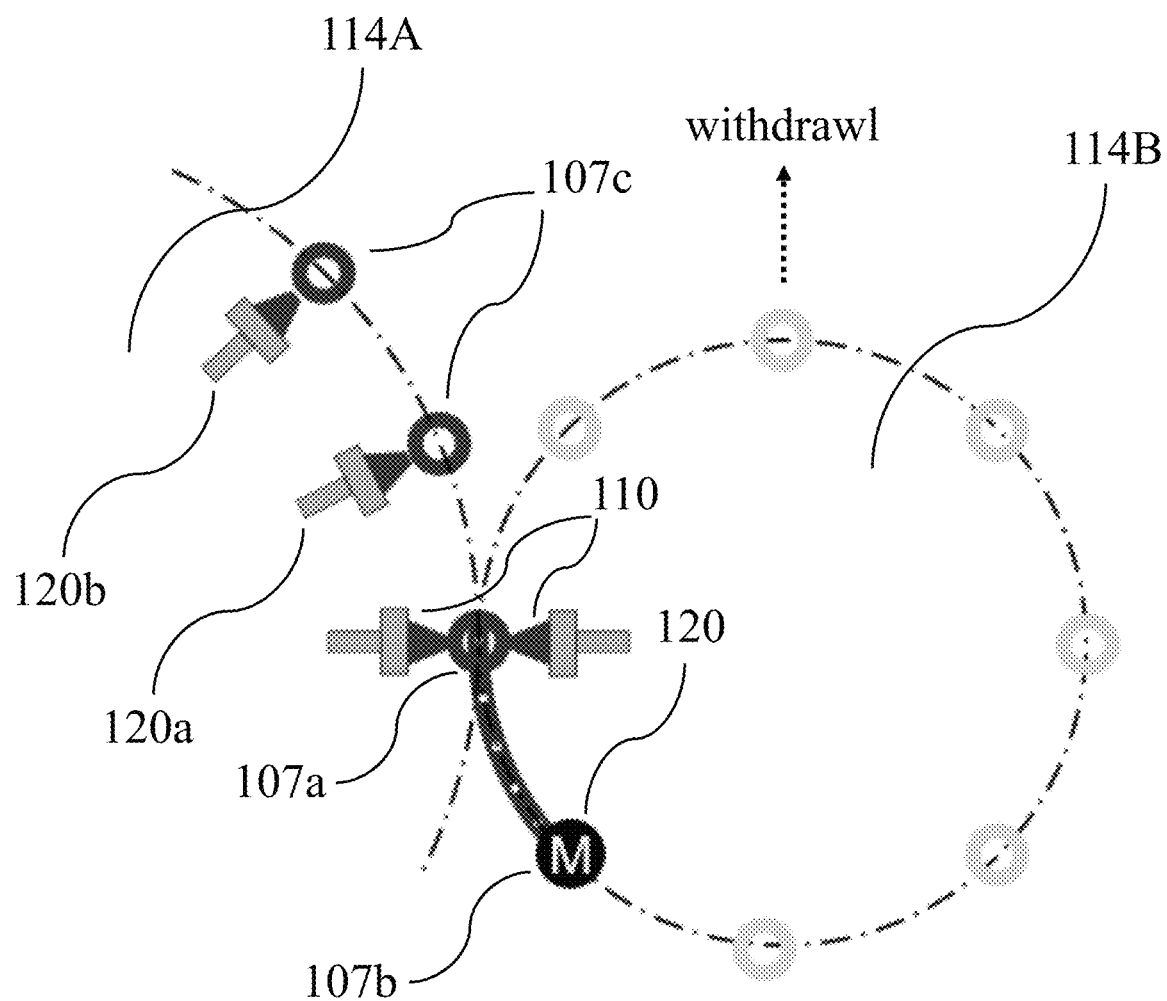
FIG. 9 shows a further particular embodiment of a glass processing machine 102 according to the present invention and also illustrates a further particular embodiment of the process according to the present invention.

FIG. 9 shows a further particular embodiment of a glass processing machine 102 according to the present invention and also illustrates a further particular embodiment of the process according to the present invention. Here, a molding tool 120 is provided at a further bottom shaping station 107b (in FIG. 9 this process station is again located at wreath 114B, but—as in case of the additional process station including an additional bottom shaping gas burner 119 shown in FIG. 8—it would also be possible to provide a single wreath 114 in which also this additional bottom shaping station 107b is provided) by means of with the final shape of the circular glass bottom 112, particularly the final shape of the outer surface of the circular glass bottom 112, is further modified.

Figure 10:
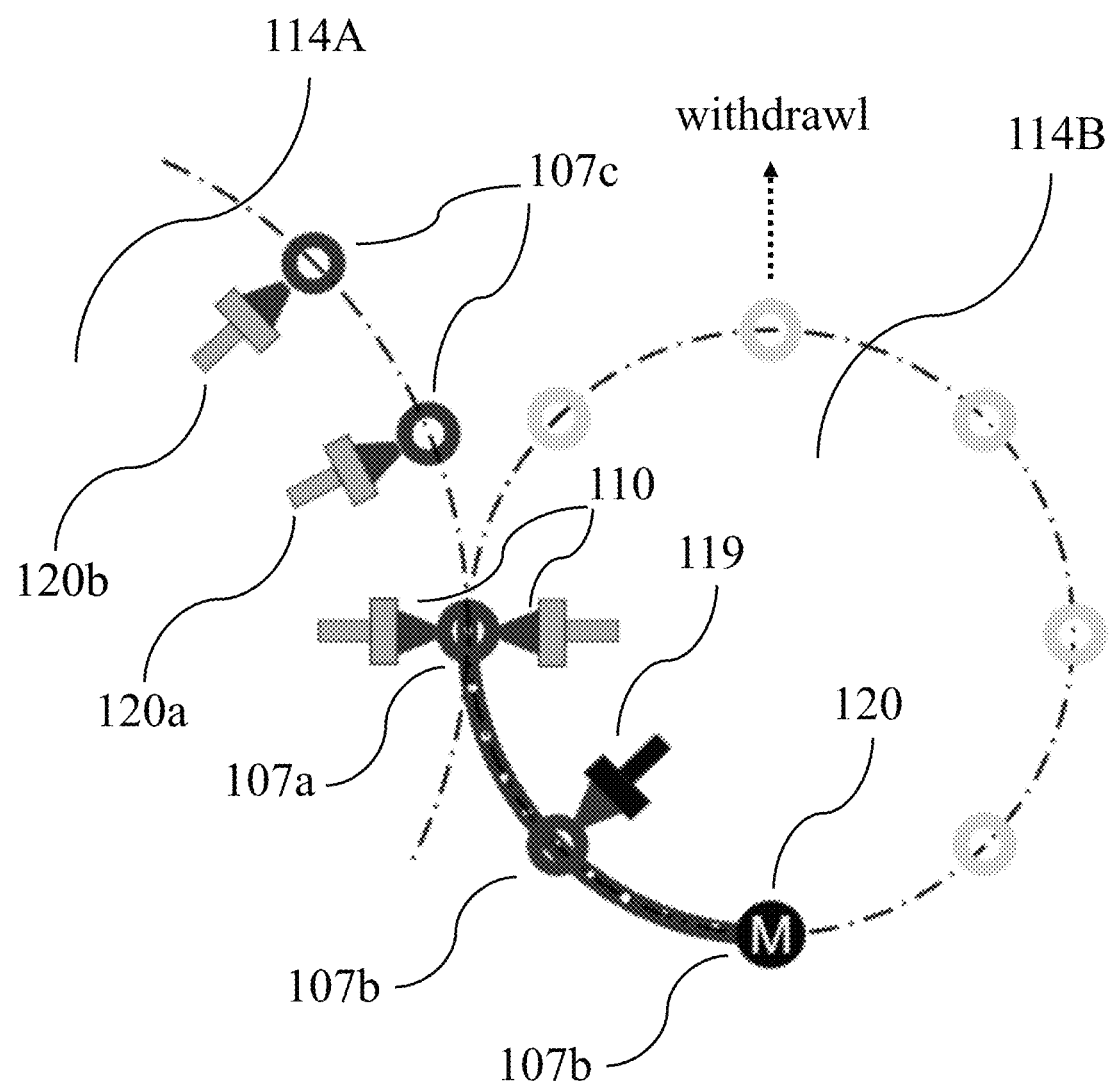
FIG. 10 shows a further particular embodiment of a glass processing machine 102 according to the present invention and also illustrates a further particular embodiment of the process according to the present invention.

FIG. 10 shows a further particular embodiment of a glass processing machine 102 according to the present invention and also illustrates a further particular embodiment of the process according to the present invention. The approach shown in FIG. 10 is a combination of the approaches shown in FIGS. 8 and 9. The glass processing machine shown in FIG. 10 includes both, a further bottom shaping station 107b that includes an additional bottom shaping gas burner 119 as well as a further bottom shaping station 107b that includes a molding tool 120.

LIST OF REFERENCE NUMERALS 100 glass container
101 glass tube
102 glass processing machine
103 first or lower portion of the glass tube 101
104 first or lower end of the first or lower portion 103
105 second or upper portion of the glass tube 101
106 second or upper end of the second or upper portion 105
107, 107a, 107b, 107c processing stations
108 first or upper clamping chucks
109 second or lower clamping chucks
110 separation gas burner
111 glass thread
112 circular bottom
113 upper end of portion 103, 105, preferably of lower portion 103
114, 114A, 114B circle (or wreath) including processing stations 107
115 glass body
116 first end of glass body 115
117 further end of glass body 115
118 cut surface
119 bottom shaping gas burner
120 molding tool

What is claimed is:

1. A process for the preparation of a glass container from a glass tube, comprising the steps of:
providing a glass tube with a first portion, a second portion, and a longitudinal axis ($L_{tube}$) that passes through a centre of the glass tube;
holding the first portion in a first clamping chuck and the second portion in a second clamping chuck;
rotating the glass tube around the longitudinal axis ($L_{tube}$) while the glass tube is held in the first and second clamping chucks;
heating the glass tube, via at least one heater, between the first and second portions to a temperature above a glass transition temperature while the glass tube is rotating around the longitudinal axis ($L_{tube}$);
separating the first and second portions from one another by pulling apart in a direction along the longitudinal axis ($L_{tube}$) while the heated glass tube is still rotating around the longitudinal axis ($L_{tube}$) by moving the first and second clamping chucks away from each other; and
moving the at least one heater, while moving the first and second clamping chucks, along the longitudinal axis ($L_{tube}$) so that the at least one heater follows a mass remaining on a circular end region of the first and/or second portion while the glass tube is still rotating around the longitudinal axis ($L_{tube}$).

2. The process of claim 1, wherein the at least one heater is at least one gas burner.

3. The process of claim 1, further comprising transporting the glass tube from one glass container processing station to a second glass processing station.

4. The process of claim 1, wherein the step of holding the glass tube in the first and second clamping chucks comprises holding the glass tube in a vertical position,
wherein the step of separating the first and second portions from one another comprises pulling the first portion downwards along the longitudinal axis ($L_{tube}$)

and pulling the second portion upwards along the longitudinal axis ($L_{tube}$), and wherein the step of moving the at least one heater comprises moving the at least one heater downwards so that the at least one heater follows an upper end of the first portion.

5. The process of claim 1, further comprising keeping a distance between the at least one heater and the circular end region constant while moving the at least one heater.

6. The process of claim 1, further comprising forming a final shape of the circular end region as a result of the heat from the at least one heater during the step of moving the at least one heater.

7. The process of claim 6, wherein the circular end region is not contacted during the step of forming the final shape.

8. The process of claim 6, further comprising equalizing a glass thickness of the circular end region.

9. The process of claim 8, wherein the step of equalizing the glass thickness further comprises maintaining the temperature above the glass transition temperature while the heated glass tube is still rotating around the longitudinal axis ($L_{tube}$).

10. The process of claim 9, wherein the step of equalizing the glass thickness further comprises contacting the circular end region with a molding tool.

11. The process of claim 6, wherein, for any cut surface of the final shape of the circular end region that is obtainable by cutting the circular end region in a plane that includes the longitudinal axis ($L_{tube}$), a condition $d_{max}/d_{tube} \times (d_{max}/d_{min}-1) \leq 1.1$ is fulfilled, and wherein $d_{max}$ is a maximum glass thickness of the final shape of the circular end region and $d_{min}$ is a minimum glass thickness of the final shape of the circular end region as determined within a cut surface within a range from $x=-0.5 \times D_{tube}/2$ to $x=+0.5 \times D_{tube}/2$, wherein the centre is at a position $x=0$, and wherein $d_{min}$ and $d_{max}$ are both measured in a direction that is parallel to the longitudinal axis ($L_{tube}$).

12. The process of claim 11, wherein the cut surface is within the range from $x=-0.65 \times D_{tube}/2$ to $x=+0.65 \times D_{tube}/2$.

13. The process of claim 11, wherein the cut surface is within the range from $x=-0.75 \times D_{tube}/2$ to $x=+0.75 \times D_{tube}/2$.

14. The process of claim 11, wherein the cut surface is within the range from $x=-0.85 \times D_{tube}/2$ to $x=+0.85 \times D_{tube}/2$.

15. The process of claim 11, wherein the condition that is fulfilled is $d_{max}/d_{tube} \times (d_{max}/d_{min}-1) \leq 0.9$.

16. The process of claim 11, wherein the condition that is fulfilled is $d_{max}/d_{tube} \times (d_{max}/d_{min}-1) \leq 0.7$.

17. The process of claim 11, wherein the condition that is fulfilled is $d_{max}/d_{tube} \times (d_{max}/d_{min}-1) \leq 0.5$.

18. The process of claim 1, further comprising:

heating, via a further heater, the first portion at an end opposite the circular end region to the temperature above the glass transition temperature while the glass tube is rotating around the longitudinal axis ($L_{tube}$); and forming an orifice at the end opposite the circular end region.

19. The process of claim 1, wherein the glass container has a glass mass ($m_g$) and an interior volume (Vi), wherein a condition is fulfilled that comprises $m_g/V_i^{0.75} < 2.0$.

20. The process of claim 1, further comprising filling an interior of the glass container with a medical or a pharmaceutical product.

21. The process of claim 1, wherein the glass tube comprises a glass selected from a group consisting of borosilicate glass, aluminosilicate glass, soda lime glass, fused silica, and any combinations thereof.

* * * * *